US008203608B2

(12) United States Patent
Ziegenbein et al.

(10) Patent No.: US 8,203,608 B2
(45) Date of Patent: Jun. 19, 2012

(54) DYNAMIC IMAGE RECORDING SYSTEM WITH SUPERIMPOSITION MOVEMENT DURING SCANNING MOVEMENT FOR MOMENTARY IMAGE STOPPING AND METHOD

(75) Inventors: Rainer Ziegenbein, Rosdorf (DE); Carl Frieder Mahr, Saarbrücken (DE)

(73) Assignee: Carl Mahr Holding GmbH, Gottingen (DE)

( * ) Notice: Subject to any disclaimer, the term of this patent is extended or adjusted under 35 U.S.C. 154(b) by 695 days.

(21) Appl. No.: 12/321,403

(22) Filed: Jan. 21, 2009

(65) Prior Publication Data
US 2009/0161118 A1  Jun. 25, 2009

Related U.S. Application Data

(63) Continuation-in-part of application No. PCT/EP2007/006543, filed on Jul. 23, 2007.

(30) Foreign Application Priority Data

Jul. 25, 2006  (DE) ................. 10 2006 034

(51) Int. Cl.
*H04N 7/18* (2006.01)
*H04N 9/04* (2006.01)
(52) U.S. Cl. ...... 348/135; 348/79; 348/128; 348/207.99
(58) Field of Classification Search .............. 348/79, 348/80, 128, 135, 207.99
See application file for complete search history.

(56) References Cited

U.S. PATENT DOCUMENTS

| 5,298,975 | A  | * | 3/1994 | Khoury et al. | 356/624 |
| 6,542,249 | B1 | * | 4/2003 | Kofman et al. | 356/601 |
| 6,917,696 | B2 | * | 7/2005 | Soenksen | 382/128 |
| 7,084,989 | B2 | * | 8/2006 | Johannesson et al. | 356/601 |
| 7,518,652 | B2 | * | 4/2009 | Olson et al. | 348/351 |

FOREIGN PATENT DOCUMENTS

| DE | 199 54 684 A1 | 5/2001 |
| DE | 10 2004 047928 A1 | 4/2006 |
| EP | 1 199 542 A | 4/2002 |

* cited by examiner

*Primary Examiner* — Ngoc-Yen Vu
(74) *Attorney, Agent, or Firm* — R. S. Lombard; K. Bach

(57) ABSTRACT

In a measuring system comprising an optical image recording system and a relative movement between the measured object and the image recording system, it is provided that the focal point (F) of the image recording system (3) be allowed to oscillate in scanning direction in order to generate—by superimposition of the oscillation movement of the focal point with the scanning movement—image recording intervals, during which the focal point (F) stops on the surface of the measured object (2) or, correspondingly, the image projected on the camera chip (7) stops on the camera chip. This preferably occurs during a steady unaccelerated relative movement between the measured object and the image recording system. Blurring of the edges of the images is avoided despite relatively long exposure times and moderate illumination intensities.

22 Claims, 3 Drawing Sheets

DYNAMIC IMAGE RECORDING SYSTEM WITH SUPERIMPOSITION MOVEMENT DURING SCANNING MOVEMENT FOR MOMENTARY IMAGE STOPPING AND METHOD

CROSS-REFERENCE TO RELATED APPLICATION

This is a continuation-in-part application of pending international application PCT/EP 2007/006543 filed Jul. 23, 2007 and claiming the priority of German application No. 10 2006 034 205.4 filed Jul. 25, 2006.

BACKGROUND OF THE INVENTION

The invention relates to a method and an apparatus for the optical surveying of a surface of a measured object by means of an image-recording system.

When taking images of a measured object by means of an image recording system, in particular when surveying the object, measures preventing a blurring of the captured image must be taken. If there is a continuous motion between the measured object and the image recording system, it is possible to use flash illumination in order to produce snapshots of the object. However, already at relatively slow speeds of, for example, 10 mm/sec and exposure times of 1/5000 sec, it is no longer possible to perform exact measuring tasks. The relative movement for the duration of the flash is already two micrometers or, with current cameras, approximately four pixels, so that the image is correspondingly blurred. In addition, there are strong light reflections when the object is illuminated with stroboscopic flash that result in the corruption of the captured image. Consequently, it is necessary to either work with very low relative speeds between the measured object and the image recording system, or with an incremental movement.

This relative movement between the measured object and the image recording system is particularly disruptive when interferometric measurements are taken. On the other hand, the principle of interferometric measurement offers a broad spectrum of options for use that should be exploited, if possible.

Document DE 10 2004 047 928 A1 discloses an optical 3D measuring process that works with a lens with a short depth of field. The lens defines a focal plane that is moved along the optical axis of the measuring system (in Z-direction) during the measuring operation. As a result of this, a series of images is recorded, this being referred to as 'ImagestackA'. In the simplest case, this image stack is recorded with the focal plane at rest, in that the movement of the focal plane relative to the surface of the object is stopped during the measurement for image capture. Alternatively, work is done with a moving focal plane, whereby the movement speed of the focal plane relative to the image recording speed is slow. In order to increase the image recording speed, the movement of the focal plane is taken into consideration during image capture.

SUMMARY OF THE INVENTION

In a measuring system comprising an optical image recording system and a relative movement between the measured object and the image recording system, it is provided that the focal point (F) of the image recording system (3) be allowed to oscillate in scanning direction in order to generate—by superimposition of the oscillation movement of the focal point with the scanning movement—image recording intervals, during which the focal point (F) stops on the surface of the measured object (2) or, correspondingly, the image projected on the camera chip (7) stops on the camera chip. This preferably occurs during a steady unaccelerated relative movement between the measured object and the image recording system. Blurring of the edges of the images is avoided despite relatively long exposure times and moderate illumination intensities.

It is the object of the invention to provide a measuring apparatus that permits an increased image recording speed. Furthermore, it is the object of the invention to provide a method suitable therefor.

As a result of the invention, it becomes possible to move the image recording system across a measured object without stopping and to thus record images of the surface of the measured object. This results in a faster measuring run or in a shorter measuring time. Blurring of the images is prevented. In addition, it becomes unnecessary to stop the movement of the measured object or the measuring system again and again, that is, to accelerate and stop it, which would lead to considerable problems in practical applications, for example, due to the vibrations generated as a result of this.

The mentioned advantages are achieved by the method in accordance with the invention, in that the image recording system, or at least one low-mass component thereof, is imparted with a relative movement in a direction opposite the scanning movement and superimposed on said scanning movement, whereby the relative movement, respectively, lasts for the duration of the image capture. The directions of the scanning movement and of the superimposition movement coincide, whereby the scanning movement is preferably a steady movement and the superimposition movement is an oscillating movement. The superimposition provides short rest phases of the relative movement. The relative movement between the measured object and the image or, in other words, between the image of the surface of the measured object projected onto the camera chip and the camera chip, becomes zero for the duration of the image capture. Thus blurring of the picture is impossible. A short image recording interval is created in that the camera has sufficient exposure time and still receives a sharp image, even with weak or moderate illumination. Many different lighting techniques may be used. The use is not restricted to stroboscopic or flash illumination. It is no longer necessary to physically stop the camera or the camera head above the surface of the measured object or to physically stop the measured object. The dwell time of the image on the camera chip is achieved by moving the optical components of the image recording system, whereby the movement may be rotary, tilt or shift movements and merely have small amplitudes. The component that is being moved may be a mirror, a lens, a prism, a parallel plate, a grid, the camera chip, the camera housing, the camera support or the like. However, any influence on the axes of the measuring apparatus, with which the optical measuring system as a whole or the measured object is moved, is not necessary. Consequently, the respectively moved mass for performing the method in accordance with the invention is kept minimal.

In principle, it is possible to trigger the scanning movement by moving the measured object or also to trigger the scanning movement by moving the image recording system. If the image recording system itself is relatively compact and lightweight, it is possible, for example, to move the measured object through the image field of the image recording system in a steady manner, whereas the image recording system itself performs an oscillating movement. During the oscillating movement, the image receiving system moves in synchrony with the measured object for a brief time. These phases of synchronous motion represent chronological image recording intervals in which a virtually still image can be recorded.

This movement may affect the entire measuring system, in that said system is oscillating. The direction of oscillation corresponds to the direction of movement of the measured object. However, it is also possible to allow only parts of the image recording system to oscillate. This minimizes acceleration-induced vibration influences on the image recording system.

Preferably, the superimposition movement is defined in such a manner that the relative movement between the measured object and the image is zero during the image recording interval. In conjunction with this, the term 'ImageA' is understood to mean the region of the measured object viewed by the image recording system. As the relative movement between the measured object and the image disappears, so does the relative movement between the camera chip and the projection image, that is, the image of the surface of the measured object projected onto the camera chip.

A servo loop may be provided, said servo loop controlling the relative movement during the image recording interval to be set to zero, in that a corresponding superimposition movement is adjusted. Furthermore, it is possible to detect the scanning speed and to prespecify the adjustment speed of the affected components in the image recording system from the start, so that the relative speed is automatically set to zero.

The superimposition movement may be achieved, at least in principle, by a uniform movement such as, for example, a rotating movement of a polygonal mirror or the like. Preferably, however, an oscillating movement with adjustable parameters (frequency and amplitude) is used. In the preferred case, the superimposition movement represents steady-state first and second time derivations. Consequently, a movement without shocks and jolts is attempted and obtained. In this context, curves with steady-state first and second time derivations are referred to as being sinuoid (sinus-like). However, it is also possible to provide a different form of oscillating movement, for example, to have it follow a symmetrical or asymmetrical curve, a triangular curve or a rectangular curve. Independent thereof, each superimposition movement preferably follows four phases, namely a measuring phase with a relative speed of zero between the image and the measured object, an acceleration phase for accelerating the component of the image recording system to advance or passing speed, the movement of the component with advance speed and slowing of the component to scanning speed (with the relative speed of zero between image and measured object). Under certain circumstances, the phase of movement of the component with advance or passing speed may be omitted when there is a direct transition from the acceleration phase into a deceleration phase.

The corresponding, above-discussed advantages result not only for the method in accordance with the invention, but also for the corresponding devices that implement the method. The actuators used for the movement of the component of the image recording system preferably are piezo actuators. They are enabled by a control and/or regulating device that takes into consideration external parameters such as, for example the scanning speed.

Preferably, the image recording system comprises several, for example, two or three actuators, that define various directions for the superimposition movement. In this manner, for example, the focal plane can be moved in Z-direction (direction of the optical axis) or in X-direction or in Y-direction, so that even in the case of spatial, that is, 3D scanning movements, the image can be stopped on the camera chip for successively occurring image recording intervals.

BRIEF DESCRIPTION OF THE DRAWINGS

Additional details and embodiments of the invention are obvious from the drawings. The drawings show exemplary embodiments of the invention, where.

DETAILED DESCRIPTION OF THE PARTICULAR EMBODIMENTS

Figure 1:
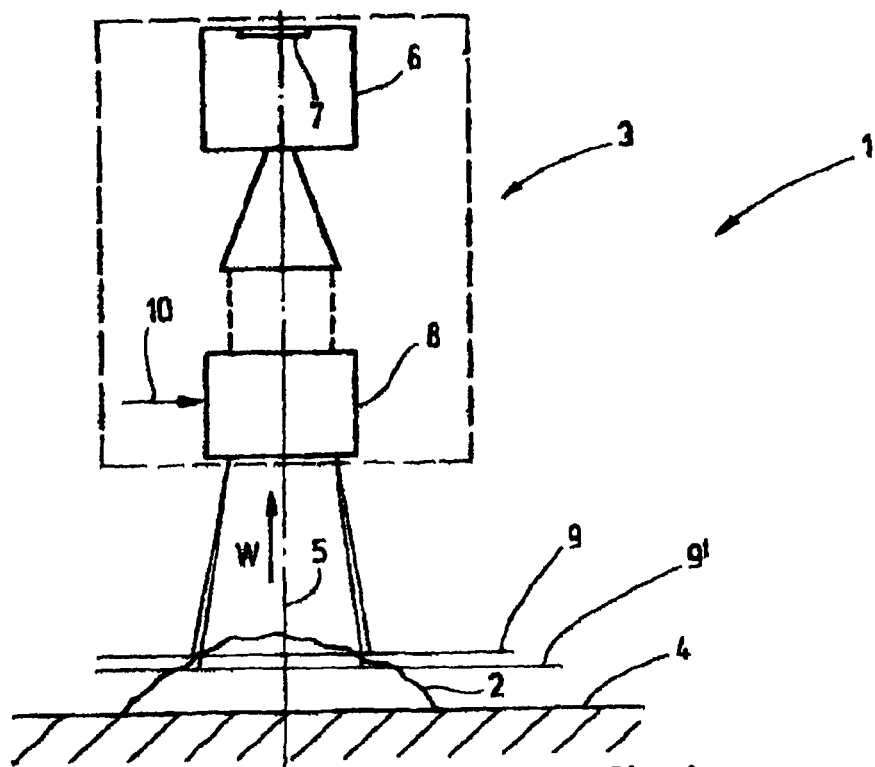
FIG. 1 is a schematic illustration of a measuring system with the measured object and the image recording system.

FIG. 1 shows a measuring system 1 for the optical surveying of a measured object 2. The measuring system 1 comprises an image recording system 3 and a support 4 for the measured object, these being movable relative to each other. Basically, the relative movement may comprise all three spatial directions. In the present exemplary embodiment, reference is made to the first illustration showing the relative movement along an optical axis 5, this axis coinciding with the W-direction of a camera coordinate system and being essentially perpendicular with respect to the support (4) of the measured object or the surface of the measured object 2. The UVW coordinate system of the camera head is basically independent of the XYZ coordinate system of a measuring apparatus. Still, the W-axis of the camera is occasionally referred to as the 'Z-DirectionA'. However, the invention can be employed in particular in cases in which the movement between the object and the camera occurs in a direction transverse to the W-direction.

The measuring system 1 implements the basic idea of the invention, according to which the relative movement between the image recording system 3 and the measured object 2 is additionally superimposed movement (superimposition movement), in order to bring the optical relative movement between the image recording system and the measured object to zero for a short time during the image recording intervals without physically stopping the movement. The superimposition movement may be a linear movement or also a pivoting movement.

The image recording system 3 comprises a camera 6 with a camera chip 7, onto which the image of the surface of the measured object 2 is projected. There, said image is converted into electrical signals that are output to an image processing device. This is achieved during chronological image recording intervals that may also be defined by the start and the stop of image capture. To achieve this, a shutter may be provided on the camera 6. However, it is also possible to electronically control the start and the stop of the image recording process on the camera chip 7, without the use of a shutter.

In addition, the image recording system 3 comprises a lens 8 that defines the focal planes 9, for example. By sliding the lens 8 along the optical axis 5 in W-direction, the position of the focal planes 9 can be changed. A piezo drive may be provided in order to perform this displacement of the focal plane 9 by a few micrometers in W-direction, for example. In so doing, a W-superimposition movement may be superimposed on a W-scanning movement, whereby the entire lens 8, with or without the camera 6, is oscillating during said superimposition movement. Correspondingly, it is possible to shift the projected image by a small interval in U-direction or in V-direction of the UVW coordinate system, if scanning occurs in U-direction or V-direction.

Alternatively, it is possible to design the lens 8 in such a manner that the focal plane 9 can be displaced in U-direction, V-direction or W-direction by a specific amount of, for example a few micrometers, so that the focal plane 9 (when scanning in W-direction) may reach the position 9' in accordance with FIG. 1. This may occur, for example, by targeted adjustment or repositioning of a single lens or of any other optical element of the lens 8. Again, this may be accomplished by a piezo actuator which is enabled via a line 10.

Figure 3:
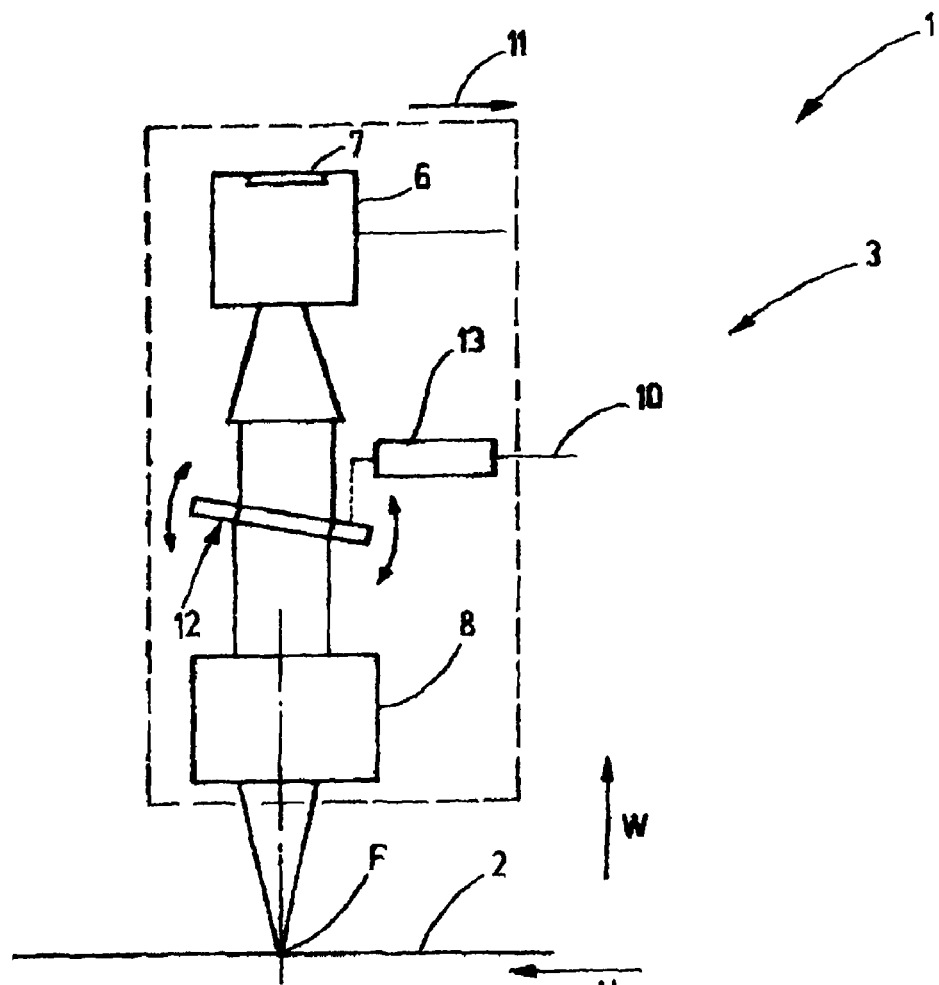
FIG. 3 is an embodiment of a measuring system comprising the image recording system for generating a superimposition movement at a right angle to the optical axis.

Whereas FIG. 1 shows an embodiment of the image recording system 3, in which the scanning direction coincides with the W-direction, FIG. 3 shows an embodiment of the image recording system, in which the scanning direction is defined in a direction transverse to the W-direction, for example, the U-direction. The image recording system 3 and the support 4 of the measured object or the measured object 2 are thus moved toward each other in a direction transverse to the optical axis 5. The scanning direction is indicated by an arrow 11. In addition to the lens 8 and the camera 6, an optical element is provided in the optical path of the image recording system, for example, an element disposed to shift the image of the measured object 2 generated on the camera chip 7 in U-direction or V-direction, that is, parallel to the surface of the camera chip 7. This may be accomplished, for example, by rotating or pivoting the parallel plate 12, as indicated by the arrows. In order to achieve this movement, an actuator 13 may be provided, said actuator being a piezo actuator, for example.

A measuring system 1 may comprise the components in accordance with FIG. 1 as well as the components in accordance with FIG. 3. Consequently, a superimposition movement in a direction that coincides at every point of the path of the scanning movement with the direction of the scanning movement may be superimposed on any rectilinear or curvilinear scanning movement. The individual components of the superimposition movement are u, v and w, and coincide with the components of the scanning movement u, v, w.

Figure 4:
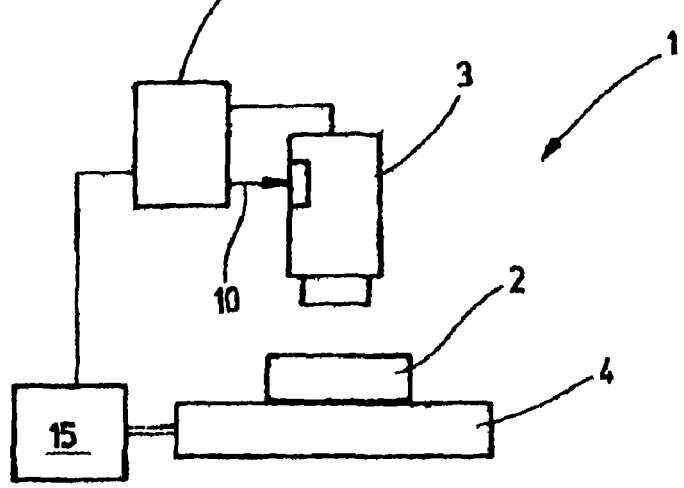
FIG. 4 is another schematic illustration of the measuring system in accordance with the invention; and, FIG. 5 is a schematic illustration of another embodiment of the measuring system in accordance with the invention.

FIG. 4 illustrates a further aspect of the measuring system 1 in accordance with the invention. The image recording system 3 is connected to a processing device 14. Said processing device is configured, for example, as an image processing device and analyzes the images supplied by the camera chip 7. In addition, it may control, for example, through the line 10, the actuator 13, see FIG. 3, or another actuator in order to displace the focal plane 9 in U-direction, V-direction or W-direction. In so doing, the displacement in U-direction or V-direction is understood to be synonymous to the displacement of the image of the measured object parallel to the surface of the camera chip 7.

Furthermore, the processing station 14 may control an actuator device 15 with which the support 4 of the measured object can be shifted in U-direction, V-direction or W-direction. Consequently, the actuator 15 may concern, for example, two or more axes of a measuring apparatus.

Figure 2:
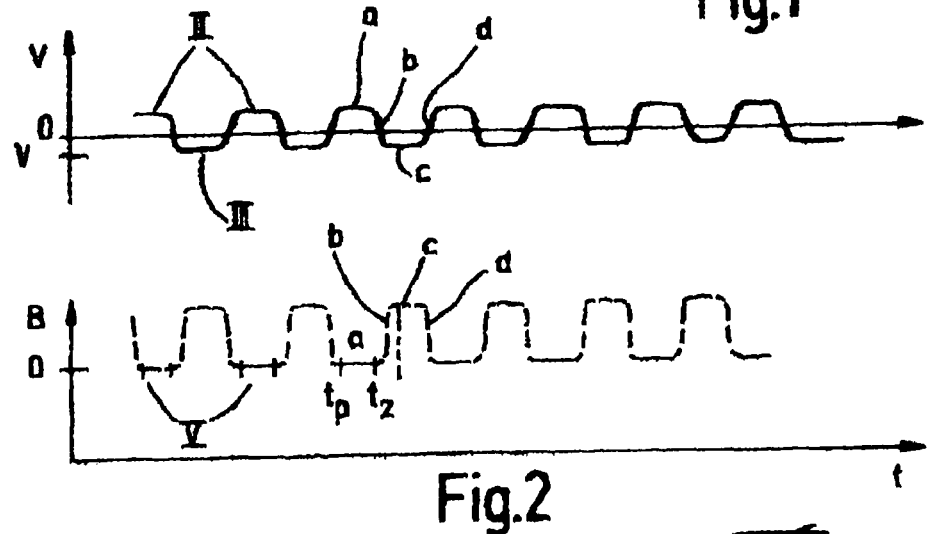
FIG. 2 shows chronological progressions of the curves of the speed of the scanning movement and of the superimposition movement.
Figure 2A:
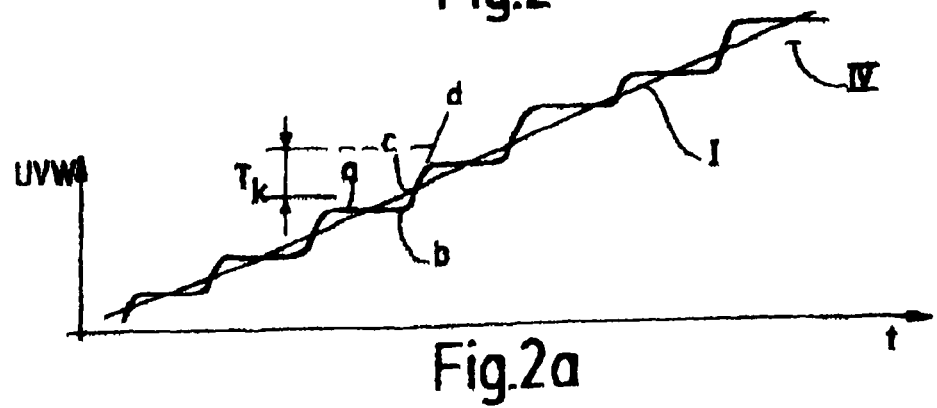
FIG. 2a shows the resultant relative movement between image and camera chip depicted as the path over time.
Figure 5:
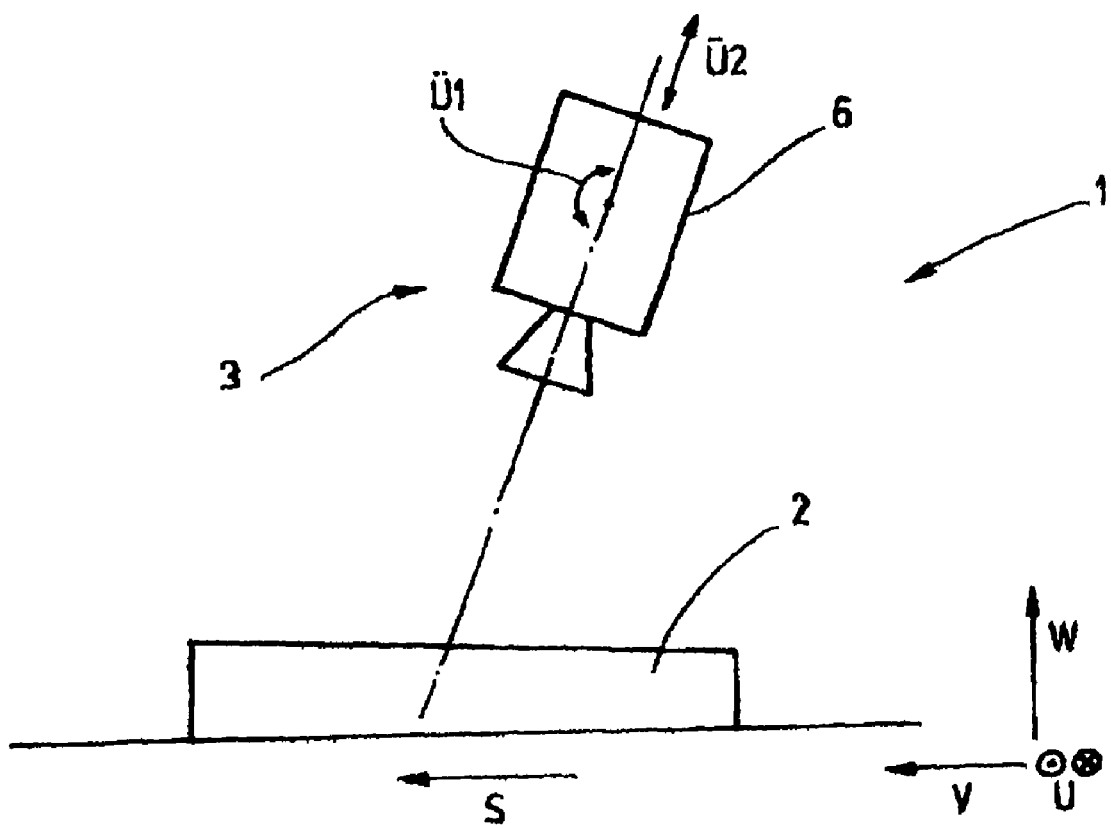

The measuring system 1 described to this extent operates as follows:

The image recording system 3 is intended for scanning the surface of the measured object 2. To accomplish this, the image recording system 3 and the support 4 of the measured object are moved relative to each other, for example, in W-direction (FIG. 1) or in U-direction (FIG. 3) and/or V-direction (FIG. 5). The path covered, in so doing, is shown in FIG. 2a by an upward inclined straight line I. This indicates, for example, a steady, unaccelerated movement that is shown in FIG. 2 as a straight line parallel to the t-axis. Now, superimposed on this movement, is a movement input via the line 10 to the actuator 13 or the corresponding actuator of the lens 8, said superimposed movement being shown in FIG. 2. This movement contains the phases II, in which the illustrated superimposition movement has a value different from zero. Between these phases II, there are phases III, in which the superimposition movement has an inverse value. The resultant vibration need not be symmetrical. However, the integral above their positive half-waves is equal to the integral above their negative half halves.

The curve IV resulting from the superimposition movement V for the location of the focal plane 9 or the image then superimposes a movement which repeatedly produces phases having a speed of zero. In FIG. 2a, this corresponds to a step function. From the view of the camera 6, the image B, as shown at the bottom of FIG. 2, is thus at rest during the image recording intervals V, that is, it has a speed of zero. The processing device 14 may be set up to control the speed V in particular in the phases II in such a manner that the image comes to rest in the image recording intervals V, that is, the superimposition speed during this interval is compensating for this interval of the scanning speed.

The superimposition movement takes place in four phases in each period. In a first phase 'a', the measuring phase, the image recording system is moved at least virtually optically at the negative scanning speed $V_{Mess\ [Measure]}$ for a time $t_P$ in scanning direction. Image recording may occur.

In a phase 'b', the image recording system moves (virtually) with sinuoidal acceleration for a time $t_z$ up to the advance speed $V_V$. In a third phase, the image recording system moves virtually at the speed $V_V$ for the time $t_P$ in scanning direction (passing operation). In a fourth phase 'd', the image recording system moves virtually at a sinuoidal acceleration (deceleration), whereupon it is offset by a path TK in scanning direction. Again an image recording interval may start. During every acceleration and deceleration operation, the sinuoidal movement displays the property that the derivations of the speed V, that is, V, V>, VA and V>A, do not contain any skips. This condition is met with regard to all sine and cosine functions. The acceleration and deceleration phases may be symmetrical to each other, this creating simple and clear conditions. This is illustrated by the following example:

Scanning speed $V_{Mess}$=1 mm/sec

Image recording frequency F=100·1/sec, $\Omega=2\pi F$

Oscillation period of the scanning frequency TK=1/F, TK=0.01 sec

The sinusoidal frequency SF determines the slope of acceleration or of deceleration. To start, it is simply assumed that the acceleration and the deceleration ramp and curve, respectively, are the same:

Sinuoid frequency SF=200·1/sec, $\omega S=2\pi SF$

Oscillation frequency of the sinuoidal frequency TS=1/SF, TS=5·10$^{-3}$/sec

TP results as the image recording time TP=TK−TS/2, TP=2·10$^{-3}$ sec.

The amplitude of the sinuoid frequency AO=$V_{Mess}$.

However, it is expedient to make the acceleration ramp faster than the deceleration ramp because, the scanning operation begins after the deceleration ramp, and, in this manner, more time is available for the scanning operation, that is, image capture.

FIG. 5 shows a slightly modified embodiment of the invention in which the image recording system 3 performs a superimposition movement that performs at least a pivoting component Ü1 and, optionally, also a linear component Ü2 (toward the measured object and away from said object). When the measured object 2 is moved essentially in a direction transverse to the image recording system 3, the camera 6—due to an oscillating pivoting movement Ü1 as a compensatory movement—can bring the camera image to a stop, as illustrated by FIG. 2 and described above, that is, respectively for a short image recording interval.

For the sake of completeness it should be noted that the principle in accordance with the invention can also be implemented in that the image recording system 3 performs a scanning movement and the measured object 2 performs the superimposition movement. In the case of light-weight measured objects, it is also possible to impart the measured object with the scanning motion as well as with the superimposition motion. Furthermore, it is possible to impart the image recording system 3 with the scanning motion, as well as with the superimposition motion and to allow the measured object 2 to remain at rest.

What is claimed is:

1. A method for the optical surveying of a surface of a measured object (2) by means of an image recording system (3) in order to record an image, said image recording system (3) including a camera chip (7), said method comprising the following steps:
   the measured object and the image recording system (3) are moved relative to each other in one scanning direction at one scanning speed,
   at least one component (8, 12) of the image recording system (3), said component defining the position of the captured image relative to the measured object (2), or the measured object (2), is imparted with a superimposition movement during which an image recording interval (V) is generated, during the image recording interval (V) the speed of the relative movement between the measured object (2) and the camera chip (7) for receiving the image is, at least for a short time, distinctly lower than the scanning speed or is zero.

2. The method in accordance with claim 1, characterized in that the superimposition movement alternately displays a direction of movement that is the same as the scanning direction or an opposing direction of movement.

3. The method in accordance with claim 1, characterized in that the superimposition movement is superimposed on a low-mass component (8, 12) of the image recording system (3).

4. The method in accordance with claim 1, characterized in that the component is a mirror and/or a lens and/or a prism and/or a parallel plate and/or a grid and/or a camera.

5. The method in accordance with claim 1, characterized in that the measured object is kept at rest during the measurement, and that the image recording system provides the scanning movement as well as the superimposition movement.

6. The method in accordance with claim 1, characterized in that the measured object is moved during the measurement in order to perform the scanning movement, and that the image recording system or the components thereof performs the superimposition movement.

7. The method in accordance with claim 1, characterized in that the speed of the relative movement during the image recording interval is detected, and that the superimposition movement is guided to follow via a control in such a manner that the resultant relative movement during the image recording interval is exactly zero.

8. The method in accordance with claim 1, characterized in that the speed of the scanning movement is detected and used as the desired value for the superimposition movement.

9. The method in accordance with claim 1, characterized in that the superimposition movement is an oscillating movement.

10. The method in accordance with claim 9, characterized in that the superimposition movement follows a curve displaying steady-state first and second time derivations.

11. The method in accordance with claim 9, characterized in that the oscillating movement follows a symmetrical curve or an asymmetrical curve, a sine curve, a triangular curve or a rectangular curve.

12. The method in accordance with claim 1, characterized in that the superimposition movement comprises at least four phases:
   a. a measuring phase for generating the image recording interval with a relative speed of zero between the image and the measured object,
   b. an acceleration phase for accelerating the component to an advance speed,
   c. a passing phase for movement of the component at the advance speed,
   d. a deceleration phase for deceleration of the component to the relative speed of zero between the image and the measured object.

13. The method in accordance with claim 1, characterized in that one image each is recorded during each image recording interval (V).

14. The method in accordance with claim 1, characterized in that the recorded images are combined to a total image.

15. A measuring system (1) for the optical surveying of a surface of a measured object (2), said measuring system (1) comprising:
   an image recording system (3) for recording an image, including a camera chip (7) for receiving the image,
   a processing device (14) for generating a relative movement between the measured object (2) and the image recording system (3) in one scanning direction with one scanning speed,
   said processing device (14) operatively connected to at least one device (13, 15), said at least one actuator device (13, 15) for generating a superimposition movement for at least one component (6, 8, 12) of the image recording system (3) or the measured object (2), said movement defining the position of the recorded image relative to the measured object (2) for generating an image recording interval (V) during which the speed of the relative movement between the measured object (2) and the camera chip (7) for receiving the image is, at least for a short time, distinctly lower than the scanning speed or is zero.

16. The measuring system (1) in accordance with claim 15, characterized in that the component of the image recording system (3) that is imparted with the superimposition movement is the total image recording system (3).

17. The measuring system (1) in accordance with claim 15, characterized in that the component (12) of the image recording system (3) that is imparted with the superimposition motion is a low-mass component of the image recording system (3).

18. The measuring system (1) in accordance with claim 15, characterized in that the component is an image-shifting device comprising a mirror and/or a lens and/or a prism and/or a parallel plate and/or a grid and/or a camera.

19. The measuring system (1) in accordance with claim 15, characterized in that, for moving the component (6, 8, 12), at least one actuator (13) is provided.

20. The measuring system (1) in accordance with claim 19, characterized in that the actuators are piezo actuators.

21. The measuring system (1) in accordance with claim 15, characterized in that, for moving the component (6, 8, 12), at least two actuators are provided with which the image can be shifted relative to the measured object in directions that are independent of each other.

22. The measuring system (1) in accordance with claim 21, characterized in that the actuators are piezo actuators.

* * * * *